United States Patent
Marhasin et al.

(10) Patent No.: US 7,157,058 B2
(45) Date of Patent: Jan. 2, 2007

(54) HIGH POWER ULTRASONIC REACTOR FOR SONOCHEMICAL APPLICATIONS

(75) Inventors: Evgeny Marhasin, Migdal Ha'Emek (IL); Marina Grintzova, Alberta (CA); Vicktor Pekker, Haifa (IL); Yuri Melnik, Alberta (CA)

(73) Assignee: Nano-Size Ltd., Migdal Ha'Emek (IL)

( * ) Notice: Subject to any disclaimer, the term of this patent is extended or adjusted under 35 U.S.C. 154(b) by 173 days.

(21) Appl. No.: 10/767,955

(22) Filed: Jan. 29, 2004

(65) Prior Publication Data

US 2004/0256213 A1    Dec. 23, 2004

Related U.S. Application Data

(63) Continuation of application No. PCT/IL02/00560, filed on Jul. 11, 2002.

(30) Foreign Application Priority Data

Jul. 30, 2001 (IL) .................................. 144638

(51) Int. Cl.
*B06B 1/00* (2006.01)
(52) U.S. Cl. .................. 422/128; 310/322; 310/323.19
(58) Field of Classification Search ............... 422/128, 422/134; 310/321, 322, 323.19
See application file for complete search history.

(56) References Cited

U.S. PATENT DOCUMENTS

| | | | |
|---|---|---|---|
| 4,158,368 A | 6/1979 | Clark | |
| 4,308,474 A | 12/1981 | Savage et al. | |
| 4,378,258 A | 3/1983 | Clark et al. | |
| 4,763,030 A | 8/1988 | Clark et al. | |
| 5,484,573 A * | 1/1996 | Berger et al. | 422/128 |
| 5,658,534 A | 8/1997 | Desborough et al. | |
| 6,079,508 A | 6/2000 | Caza | |
| 6,361,747 B1 * | 3/2002 | Dion et al. | 422/128 |
| 6,620,123 B1 * | 9/2003 | Mitragotri et al. | 604/22 |

OTHER PUBLICATIONS

K.S. Suslick, Sonochemistry, Science 247, pp. 1439-1445 (Mar. 23, 1990).
W.E. Buhro et al, Material Science Eng., A204, pp. 193-196 (1995).
K.S. Suslick et al, J.Am. Chem. Soc., 105, pp. 5781-5785 (1983).
Telesonic Co., Products Bulletin.
D. Martin and A.D. Ward, Reactor Design for Sonochemical Engineering, Trans IChemE, vol. 17, Part A, May 1992, 29, 3.

* cited by examiner

*Primary Examiner*—Krisanne Jastrzab
*Assistant Examiner*—Sean E. Conley
(74) *Attorney, Agent, or Firm*—Martin Fleit; Paul D. Bianco; Fleit Kain Gibbons Gutman Bongini & Bianco, P.L.

(57) ABSTRACT

Ultrasound device having a reaction chamber, which includes a magnetostrictive transducer and a horn transmitting ultrasound radiation substantially uniformly throughout the reaction chamber. The horn is hollow and is constituted by a cylinder having an empty inner chamber at its core defining a resonance chamber, which may be cylindrical and may comprise a plurality of sections of cylindrical shape or a central section of larger diameter and two terminal sections of smaller diameter.

11 Claims, 5 Drawing Sheets

λ-Wave length

HIGH POWER ULTRASONIC REACTOR FOR SONOCHEMICAL APPLICATIONS

RELATED APPLICATION

This application is a continuation of International Application PCT/IL02/00560, filed Jul. 11, 2002, the contents of which are here incorporated by reference in their entirety; priority is claimed under 35 USC 120.

BACKGROUND OF THE INVENTION

1. Field of the Invention

The present invention relates to an improved ultrasonic generating and radiating device for use in a sonochemical reactor. More particularly, the invention relates to a device comprising transducers, preferably of the magnetostrictive type, and horns (sonotrodes) that emit ultrasound to the entire volume of a reactor containing liquid, wherein the distribution of ultrasonic energy and acoustic cavitation is homogeneous throughout the reactor volume, leading to an increase in the efficiency of sonochemical processes.

2. Prior Art

Ultrasonic energy has many applications in present-day technology in physical and chemical processes. Some general references are:

1) K. S. Suslick, Sonochemistry, Science 247, pp. 1439–1445 (23 Mar. 1990);
2) W. E. Buhro et al., Material Science Eng., A204, pp. 193–196 (1995);
3) K. S. Suslick et al., J. Am. Chem. Soc., 105, pp. 5781–5785 (1983);
4) Telesonic Co., Products Bulletin.

This invention relates to a type of reactor in which the reaction occurs in a localized space filled with a material, generally a liquid phase, which may contain solid particles. By the term "reaction" is meant herein whatever phenomenon is caused or facilitated by the ultrasonic radiation, viz. not necessarily a chemical phenomenon, but a physical one or a combination of the two, as well. A reactor of this type is coupled to a transducer, wherein an oscillating, generally alternating, electromagnetic field is generated and an ultrasound emitting means, generally and hereinafter called "horn" or "sonotrode", receives the ultrasonic vibrations from the transducer and radiates them outwardly into the space occluded by the reactor, hereinafter called "the reaction volume". The combination of transducer and horn will be called hereinafter, for brevity's sake, "ultrasonic device". The reactor contains a material to be treated by ultrasound, which will be called hereinafter "reaction material". The reaction material generally comprises a liquid phase and fills the reaction chamber.

There are several types of ultrasonic reactors. One of them is the loop reactor, described e.g. in D. Martin and A. D. Ward, Reactor Design for Sonochemical Engineering, Trans IChemE, Vol. 17, Part A, May 1992, 29, 3. Inside this reactor, a liquid, which is to be subjected to ultrasonic treatment, is caused to flow in a closed loop formed by a vessel provided with a stirrer and by a conduit in which the ultrasonic generator is housed.

The propagation of ultrasound from a source in an unbounded liquid medium is illustrated in FIG. 2 of the same publication. In this case, the sonochemical active zone is limited to a frusto-conical space diverging from the radiating face of the transducer.

Also, several transducers may be placed around an elongated enclosure, as in Desborough, U.S. Pat. No. 5,658,534 and Caza, U.S. Pat. No. 6,079,508.

The principal drawback of the aforementioned technique is non-homogeneous distribution of ultrasonic energy inside a reaction volume in longitudinal and transversal directions that leads to inefficient sonochemical reactions. The disadvantage is in the limited volume in which acoustic cavitation, hence chemical reaction, takes place.

The application of multiple transducers is used by Dion, U.S. Pat. No. 6,361,747, where multiple transducers are operating at a phase shift from one another, leading to inefficient and non-homogeneous ultrasonic energy coupling that arises from the interference of oscillations with phase deviations.

The purpose of technical solutions described in Dion U.S. Pat. No. 6,361,747 and in Desborough, U.S. Pat. No. 5,658,534 is to create a maximal intensity of ultrasonic oscillations in the center area (that is the area coinciding with the axis of the reactor) leading to a narrow focal zone (cavitation flux) in the center of the volume. The described reactors have a low resonant merit factor because the tube operates in the bending mode of operation and not in the mode of linear oscillations. Such reactors cannot be applied for efficient sonochemical processes, particularly for nano-particle production, which demand an essentially homogeneous distribution of ultrasonic energy throughout the reaction volume.

An additional drawback of the ultrasonic device described by Dion U.S. Pat. No. 6,361,747 is the following: for full energy transmission, it is necessary to provide very tight acoustic contact between ends (edges) of segmental radiators and tube surface, as well as between waveguide and acoustic transducer. The implementation of acoustic contact leads to high-energy losses and to conversion of this energy into high amounts of heat.

The transducers of ultrasound devices can be of various types. Most common transducers are piezo-electric ones. Therein, the generator of the ultrasound typically consists of a piezo-electric element, often of the sandwich type, coupled with a horn having a generally circular emitting face. Piezo-electric transducers, however, have a maximum power not more than 2 kW and a low oscillation amplitude dictated by the fragility of piezo-electric elements, which can be destroyed under prolonged operation. They are also not reliable compared to magnetostrictive transducers, to be described hereinafter, because their amplitude drifts under operation, causing transducer failure and lower energy output, leading to operation parameters that must be manually corrected. Similar properties are also possessed by electrostrictive materials polarized by high electrostatic fields.

Another type of transducer is that based on the use of a magnetostrictive material, viz. a material that changes dimensions when placed in a magnetic field, and conversely, changes the magnetic field within and around it when stressed. When a magnetostrictive material is subjected to an oscillating magnetic field, the material will alter its dimensions at the same frequency with which the magnetic field is alternated.

A magnetostrictive transducer must comprise a magnetostrictive element, e.g. a rod or another elongated element, located in a space in which an oscillating magnetic field is produced. In its simplest form, such a transducer would comprise a nucleus of magnetostrictive element and a coil disposed around said element and connected to a generator of oscillating electric current. However, different forms of transducers can be devised to satisfy particular requirements: for instance, U.S. Pat. No. 4,158,368 discloses a toroid-shaped core of magnetic metal, about which a coil is wound, which toroid defines with its ends an air gap in which a magnetostrictive rod is located.

The ultrasonic transducer transforms the electromagnetic power into ultrasonic power transmitted to an emitting tool—a horn (sonotrode). It will be said hereinafter that the horn emits the ultrasound into a reactor volume, but no limitation is intended by said expression, which is used only for the sake of brevity. Generally, the horns of the prior art have a slim frusto-conical shape or a stepped or exponential shape. In every case, they concentrate the ultrasonic oscillations and emit them from their extremity, which is generally circular and of reduced dimensions. The ultrasonic waves have, therefore, a high intensity only at the extremity of the horn and spread out from it in a conical configuration, so that they reach only certain regions of the reactor volume and at any point of said volume their intensity is reduced, generally in proportion to the square of the distance from the horn extremity. At their area of maximum intensity various phenomena occur, including heating, cavitation, evaporation, and so on, which absorb and waste a large portion of the ultrasonic energy, resulting in a process of low efficiency (ratio of power spent for required process to overall power), which is generally on the order of 20–30%. Additionally, some desired phenomena that are produced by the high energy density at the extremity of the horn may become reversed at a distance from said extremity: for instance, if it is desired to fragment solid particles, contained in a liquid phase, into smaller ones, such smaller particles produced near the extremity of the horn, migrate through the liquid phase and coalesce to some extent at a distance from said extremity, so that the final particles obtained are not as small as desired.

It is a purpose of this invention, therefore, to provide a sonochemical reactor that is free from the drawbacks of prior art ultrasonic devices.

It is another purpose of this invention to provide a sonochemical reactor with substantially homogeneous distribution of ultrasonic energy throughout the volume of the reactor.

It is a further purpose of the invention to provide such an ultrasonic device comprising a transducer that is inexpensive and durable and has a high oscillation amplitude, up to 45 microns.

It is a still further purpose of this invention to provide an ultrasonic device that emits the ultrasonic waves homogeneously in a radial direction, converting longitudinal oscillations into transversal type.

It is a still further purpose of this invention to provide a sonochemical reactor of high power, e.g., up to 5 Kw and more.

It is a still further purpose of this invention to provide a sonochemical reactor, which has at least 60% efficiency, e.g., 60–80%.

It is a still further purpose of this invention to provide a sonochemical reactor, in which there is no occurrence of undesired phenomena at a distance from the horn.

It is a still further purpose of this invention to provide a sonochemical reactor for the effective and high throughput production of nano-scale materials.

It is a still further purpose of this invention to provide a sonochemical reactor for the production of nano-powder materials.

It is a still further purpose of this invention to provide a sonochemical reactor for the production of nano-structured metal powders.

It is a still further purpose of this invention to provide a sonochemical reactor for the production of nano-structured metal oxide powders.

It is a still further purpose of this invention to provide a sonochemical reactor for the production of nano-structured metal hydroxide powders.

It is a still further purpose of this invention to provide a sonochemical reactor for treating agglomerated materials and effecting de-agglomeration.

It is a still further purpose of this invention to provide a means for the acceleration of chemical reactions.

SUMMARY OF THE INVENTION

The sonochemical reactor of this invention comprises a transducer and a horn (see FIG. 1), which are different from, and improved with respect to, the prior art, as will be explained hereinafter. The horn of this invention is mostly intended to be immersed in the reaction material. In the following description the reactor will be assumed to have an axis of symmetry and the horn also to have an axis of symmetry coinciding with the axis of symmetry of the reactor; however this is not to be construed as a limitation, since the invention covers an ultrasonic device as hereinafter defined and is not limited to the reactor with which said device is used, nor to the position in which said device is located with respect to the reactor, nor to the properties of the reaction material.

The transducer comprises preferably a magnetostrictive element of a special alloy, which alloy comprises iron, cobalt, and rare earth elements, such as, but not limited to, nickel, vanadium, dysprosium, terbium, etc. The shape of the transducer comprising a preferable magnetostrictive element may vary to satisfy particular requirements. Preferred shapes will be described hereinafter. The dimensions of any such element are calculated to resist metal fatigue and to give maximum oscillation amplitude. All the electromagnetically relevant parameters of the transducer, for instance the dimensions of the coil that generates the magnetic field, the intensity and frequency of the alternating current fed to said coil, and the like, must be determined to produce the desired magnetic field, and persons skilled in the art will have no difficulty in doing so. For purposes that will be described hereinafter, the ultrasound device of the invention may be combined with a source of exciting current, the frequency of which can be gradually varied. However, the optimum frequency for each specific device to be used for a specific process is generally determined and fixed in accordance. For example, such frequencies may be in the range of 10 to 40 KHz.

Figure 2:
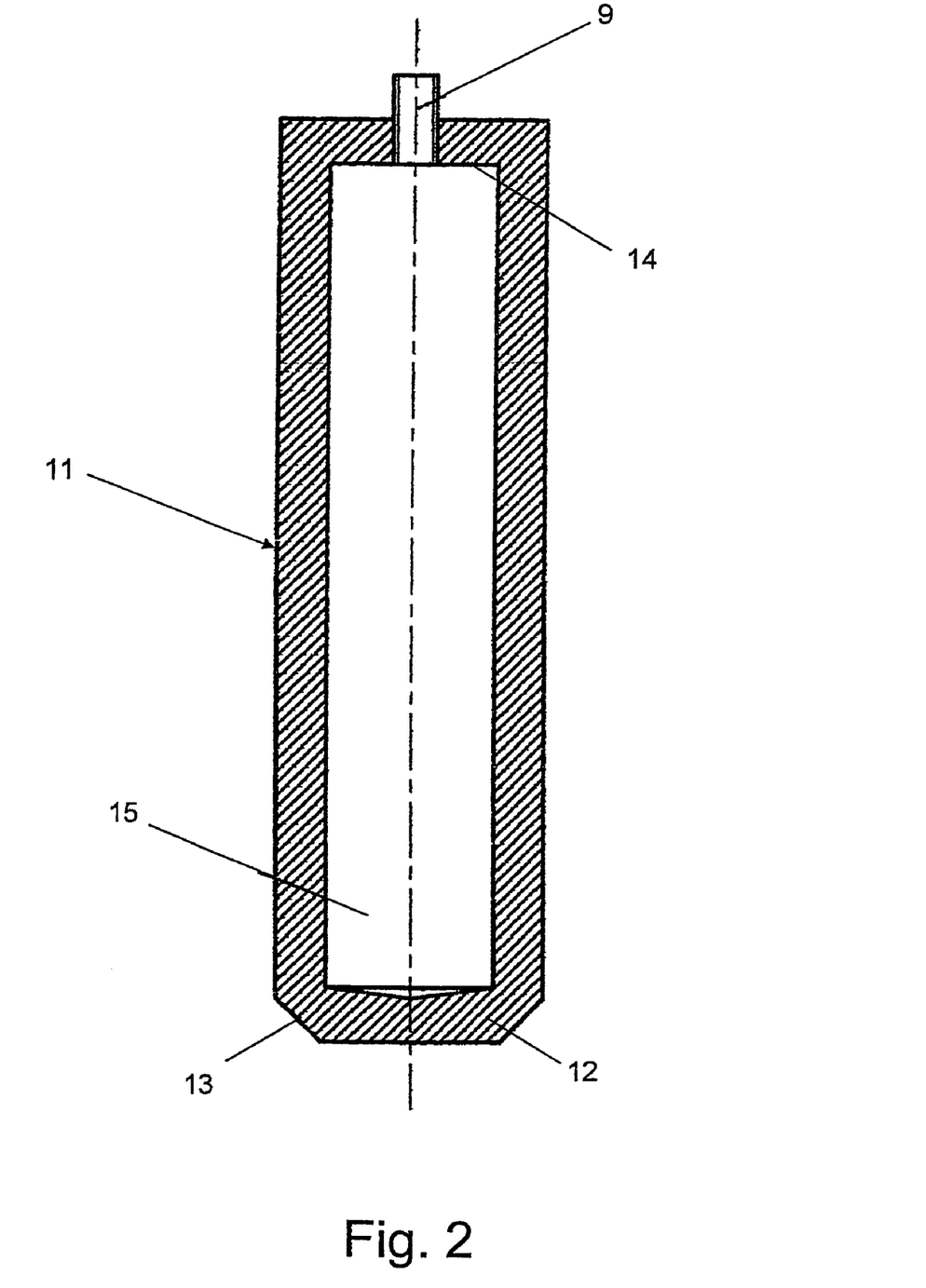
FIG. 2 is an axial cross-sectional view of a horn according to an embodiment of the present invention.

The horn of this invention, contrary to prior art horns, is of a hollow resonant type (see FIG. 2). The length of the horn is resonant, namely it is equal to half a wavelength or several half wavelengths in the horn material. Said horn is additionally characterized by an internal resonant cavity, consisting of several advantageous functions: 1) Said cavity reduces the thickness of the horn walls, thereby increasing the ease of horn wall motion and amplitude with a given driving force; 2) Said cavity causes an uneven transmittance of transducer power to the horn, forming a standing wave that forces the horn walls to vibrate; 3) Said cavity increases the horn vibrations through resonance that is the result of interaction between parallel vibrating walls. In a first embodiment of the invention, the shape of said cavity matches the outer shape of the horn, defining a uniform horn wall thickness. Therefore, since the horn is preferably cylindrical, the cavity is preferably of a cylindrical shape. In a second embodiment of the invention, said cavity comprises a plurality of cylindrically shaped sections, preferably equivalent, thereby providing additional advantages that will be explained hereinafter.

In a preferred embodiment, the resonant cavity comprises a central section of larger diameter and two symmetrical, extreme or end sections of smaller diameter. In a form of said preferred embodiment, the horn comprises a body, which defines the central section of the resonant cavity and one of its extreme sections, and a plug which defines the other extreme section of the resonant cavity and which is connected to the body, preferably screwed into it, at one end thereof. Preferably, the two extreme sections are symmetric to one another with respect to the central section.

Horns are generally made, in the art, of a titanium alloy, e.g. Ti-4V-6Al, but for the purposes of this invention the horn and the aforesaid plug are preferably made of stainless steel (316L/302 ASTM). The transducer is connected to one of the ends of the horn, preferably the end into which the plug, if any, is inserted, e.g. by a connecting insert, screwed into both the said end, preferably the said plug, of the horn and into the transducer.

The ultrasonic power generated by the transducer of the invention is emitted outwardly from the entire surface of the horn, comprising its sides, and not merely from its extremity, as in prior art horns. In the prior art horns, the only emitting surface is a narrow extremity and the ultrasonic waves spread out from it in a conical configuration; therefore the ultrasound has a high intensity at said extremity and becomes weaker as it spreads out from it, roughly inversely proportional to the square of the distance from said extremity. In the horn of the present invention the irradiating surface is practically the entire outer surface of the horn and the ultrasound intensity is substantially uniform throughout the reaction space, although it is still somewhat higher at the horn extremity, as will be explained hereinafter. This leads to a greatly increased efficiency, on the order of 60–80%, as has been said.

The internal volume of said reactor is characterized by resonant properties as well. The distance between the emitting surface of said horn and the reactor walls is equal to a whole number of half wavelengths in the contained liquid. The distance between the surface of the extremity of said horn and the bottom internal surface of said reactor volume is equal to whole number of half wavelengths in the contained liquids.

The generated acoustic standing wave in the reactor volume, which operates as a hollow resonator, in combination with uniform emission of ultrasound from the surface of the horn as well as from its extremity, provides homogeneous distribution of ultrasonic energy over the reactor volume.

DETAILED DESCRIPTION OF PREFERRED EMBODIMENTS

Figure 1:
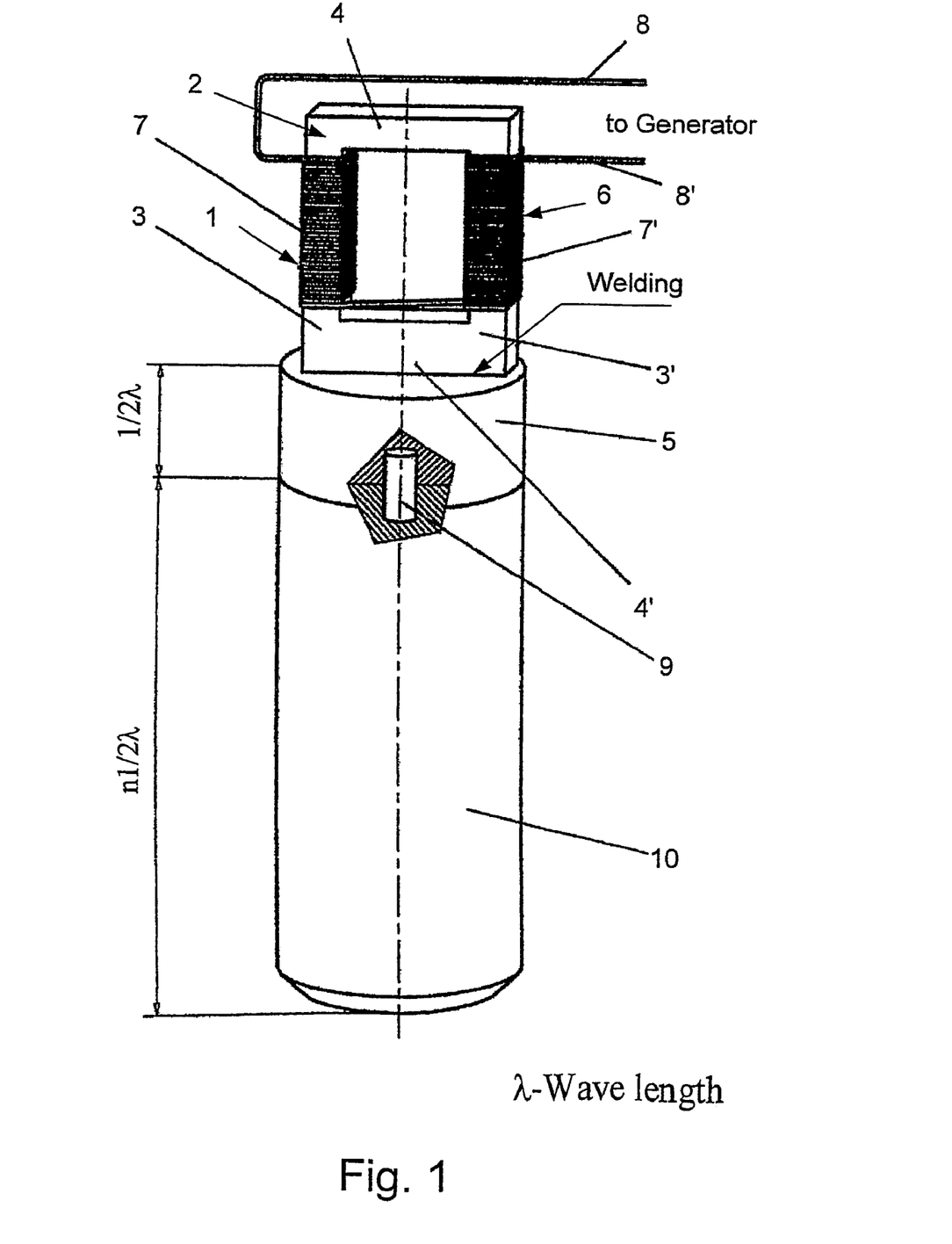
FIG. 1 is a perspective view of a transducer, coupled with a horn, in accordance with an embodiment of the present invention.

FIG. 1 illustrates an ultrasonic device comprising a transducer, generally designated as 1, and its connection to a horn, generally designated as 10, in accordance with an embodiment of the invention. Transducer 1 is connected to and supported by base 5 by a weld, or any other suitable, connection. The transducer comprises a magnetostrictive element 2, which in this embodiment comprises two vertical branches 3 and 3' and two horizontal branches 4 and 4' connecting said vertical branches; the lower branch 4' being welded to base 5.

Coil 6 comprises two branches 7 and 7' wound about the vertical branches 3 and 3' of the magnetostrictive element and connected at their ends 8 and 8' to an AC power generator (not shown). The same electric current flows through both branches of coil 6 and generates the same magnetic field about branches 3 and 3' of the magnetostrictive element.

Base 5 is of a height or length equal to a whole number of half-wavelengths, preferably one half-wavelength, of ultrasonic waves as generated by the transducer and corresponding to the frequency of alternating current flowing through coil 6. A connecting insert 9 is screwed to horn 10 and to base 5, wherein the screw connections are wound tight to ensure a strong mechanical coupling between transducer 1 and horn 10. The horn, in this embodiment, has a resonant length equal to a whole number "n" of half-wavelengths in the horn material.

FIG. 2 is an axial (generally vertical) cross-section of a horn, generally designated as 11. Horn 11 is cylindrical, except for a short, frusto-conical, bottom portion cut-off 13 of its bottom plate 12. The connecting insert 9 is mounted by a threaded connection to top plate 14 of horn 11. Horn 11 is hollow, filled generally with air, and defines a cylindrical resonant cavity 15, coaxial with the outer surface of the horn, so that the longitudinal (generally vertical) walls of the horn are of a uniform thickness. Horn 11 is therefore, operating as a hollow resonator for ultrasonic oscillations.

Under the ultrasonic oscillations produced by the transducer, the horn walls oscillate elastically, expanding and contracting periodically substantially in the transversal direction according to Poisson's effect, wherein an efficient transformation of longitudinal ultrasonic oscillations received from the transducer into transversal ultrasonic oscillations of the external walls of the horn, generally defined as "Push-Pull". The maximum amplitude of longitudinal mode of ultrasonic oscillations is at the top and bottom plates of the horn because resonant length of the horn is equal to a whole number of half-wavelengths in the horn material. The maximum amplitude of transversal mode of ultrasonic oscillations is situated practically halfway between the top and bottom plates on the side surface of the horn due to resonant conditions in the medium filled internal cavity of the horn, generally air.

The conditions defining the maximum amplitude of longitudinal oscillations to be at the extremities of the horn and maximum amplitude of transversal oscillations to be situated on the side surface, halfway between top and bottom plates of the horn, are the ones leading to homogeneous ultrasonic emission outwardly into the medium surrounding the horn. During application the horn is mounted in a reactor and immersed in a liquid medium, generating a process where said elastic oscillations of said horn produce alternate compression and decompression cycles on said medium; wherein homogeneous ultrasonic emission leads to homogeneous acoustic cavitation throughout the medium, a process that is extremely important for sonochemical applications.

Figure 3:
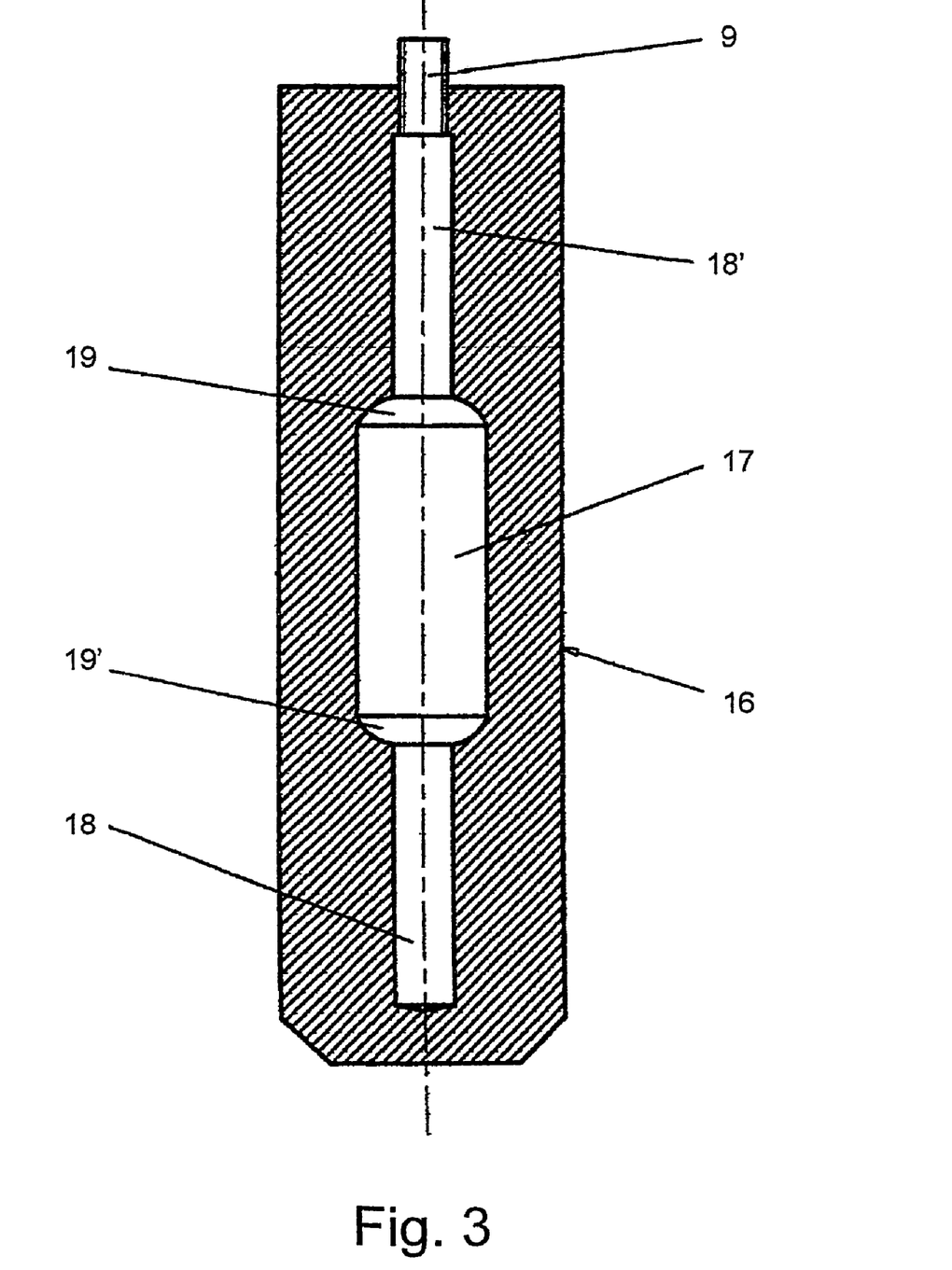
FIG. 3 is an axial cross-sectional view of a horn according to a second embodiment of the present invention.

The applicant has found, however, that it is advantageous to provide essentially cylindrical horns, the walls of which have portions of different thicknesses. In this case, elastic oscillations will be produced having different amplitudes along the horn, greater, in horn sections of equal lengths, where the horn walls are thinner. The applicant has found that, in this case, the ultrasonic energy produced and transferred to the reactor medium—"the output energy"—is greater than when the horn resonance chamber is cylindrical, all other things being equal. Such an embodiment is shown in FIG. 3. The horn 16 has the same outer shape as the horn 11, but the internal resonant cavity comprises a central section 17 and two symmetric sections 18 and 18' of smaller diameter than said central section 17 and connected thereto by curved annular surfaces 19 and 19'. The whole resonant cavity is symmetric with respect to a transversal plane passing through the center of section 17. The walls of the horn are thinner where they define said section 17.

However, making a horn as shown in FIG. 3 would require providing at least two halves or unequal portions, boring them to define the various parts of the resonant cavity, and then connecting them by welding or the like. Such a connection would not adequately resist the stresses caused by ultrasonic, elastic oscillations. Therefore, a preferred embodiment of a horn, having a resonant cavity comprising the same sections shown in FIG. 3, is illustrated in FIGS. 4 and 5.

Figure 4:
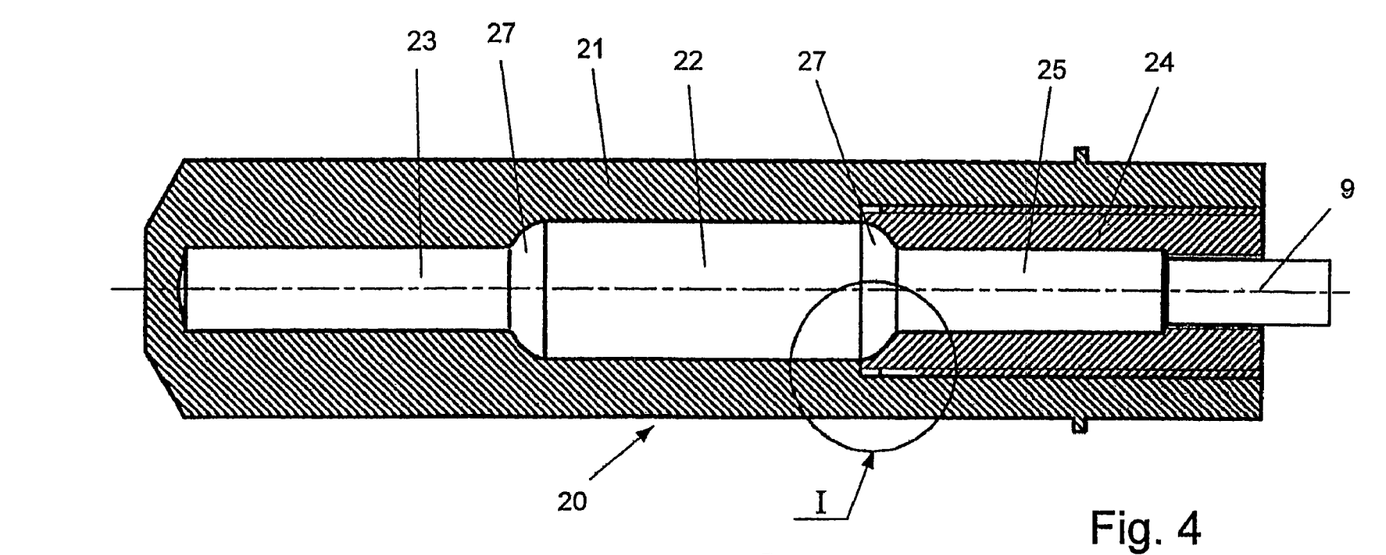
FIG. 4 is an axial cross-sectional view of a horn according to a third embodiment of the present invention.
Figure 5:
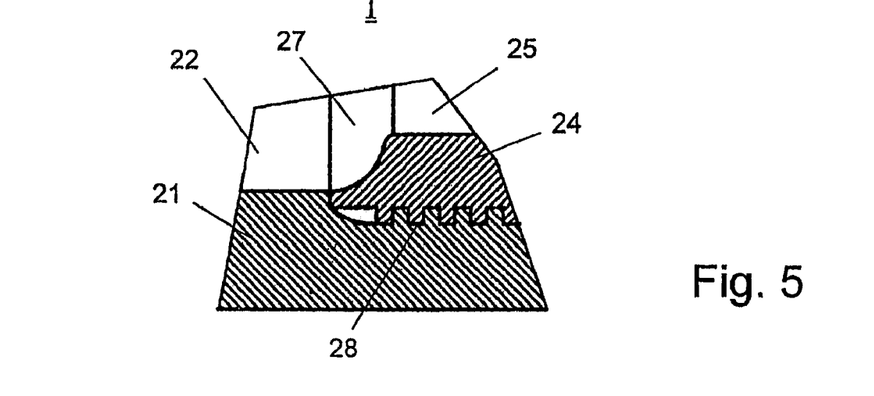
FIG. 5 is an enlarged view of FIG. 4, particularly illustrating the screw connection between the body and plug elements of the horn.

FIG. 4, and its enlarged FIG. 5, illustrate a horn 20, comprising a body 21, defining the central section of the resonance chamber 22, and a terminal section 23 of said resonance chamber 22. The horn further comprises a plug 24 screwed into the body 21, which defines the second terminal section 25 of the resonant cavity. The two terminal sections 23 and 25 are of the same length and diameter. Connection insert 9 is screwed into said plug 24 and extends outwardly from said plug, preferably by one-half its length, to provide an external section onto which the base 5 can be screwed firmly to connect the horn to the transducer, as shown in FIG. 1. Central section 22 of the resonant cavity blends with the terminal sections 23 and 25 through annular sections 27.

For example, in the embodiment illustrated, the sections of the resonant cavity may have the following dimensions: the central section may have a diameter of 15 to 45 mm and a length of 60 to 105 mm; the terminal sections may have a diameter of 8 to 28 mm and a length of 20 to 90 mm.

In the embodiment illustrated, body 21 of the horn is connected with plug 24 by means of a square screw thread 28 (see FIG. 5). The ultrasonic radiation intensity, supposed to be high, is distributed throughout the reactor volume as homogeneously as possible. The energy levels should preferably be from 3 to 7 W per square centimeter of the horn's outer surface. When the reactor chamber is filled with liquid, said homogeneous intensity distribution can be achieved by the ultrasonic resonance of the liquid in addition to homogeneous ultrasonic emission from the horn. For example, the energy intensity may reach high levels, such as 0.2–0.6 W per cubic centimeter of the horn volume.

In order to reach a homogeneous volume density of the ultrasonic energy inside the reactor volume, the reactor chamber comprises a hollow acoustic resonator, wherein the distance between the emitting surface of the horn and the reactor walls is equal to a whole number of half wavelengths in the contained liquid. The distance between the horn tip (extremity) and the bottom internal surface of the reactor volume is equal to a whole number of half wavelengths in the contained liquid.

It should be mentioned that the important condition of homogeneous ultrasonic energy distribution throughout the internal reactor volume is achieved by a homogeneous emission of ultrasonic energy from the side and bottom surfaces of the horn.

In a preferred design, the length of the horn should be equal to a whole number of ultrasonic radiation half-waves. The wavelength $\lambda$ of the ultrasonic radiation is given by $\lambda=v/\gamma$, where $\gamma$ is the ultrasonic frequency, and v is the ultrasound propagation velocity in the horn material.

The intensity I of the ultrasonic radiation corresponding to an energy W, assumed to be homogeneously distributed, is I=W/S, wherein S is the area from which the ultrasound is irradiated. In ideal cases, the intensity I can be calculated from the formula $I=v\rho\gamma^2A^2$, where v is the ultrasound velocity in the medium, p is the density of the medium, $\gamma$ is the ultrasonic frequency and A is the amplitude of ultrasonic waves.

In solid horn designs of the prior art it is possible to observe weak oscillations and cavitation on the side surface of the horn. Those weak radial oscillations constitute the manifestation of the Poisson effect, according to the formula: $\chi=-\epsilon'/\epsilon$, where $\chi$ is the Poisson coefficient, $\epsilon'$ and $\epsilon$ are respectively the radial (transversal) and the longitudinal modules. In ultrasonic oscillations the speed of deformations is very high, and the material of the horn can be considered incompressible.

The amplitude of the radial elastic oscillations can be calculated from the formulae:

$$G=E/2(1+\chi);$$

$$E=K/3(1+2\chi);$$

$$\sigma=K\epsilon;$$

where E is Young's modulus, K is the volume elasticity module; G is the module displacement, $\chi$ is the Poisson coefficient, $\sigma$ is the stress and $\epsilon$ is the strain.

In solid horns, radial oscillations are small because of tangent stress relaxations in the entire metal volume. For excluding relaxation phenomena, the horn mass has to be reduced while maintaining the surface area, the horn construction should therefore be tubular. In relatively thin walls, the radial amplitude may reach 0.5 of the longitudinal amplitude. Therefore the parameters of the horn should be determined according to: 1. The desired amplitude of radial oscillations; 2. The desired ultrasonic power to be emitted from the outer surface of the horn; 3. The surface area that will provide the desired ultrasonic intensity; and 4. The fatigue resistance of the horn material to the ultrasonic wave propagation.

Figure 6:
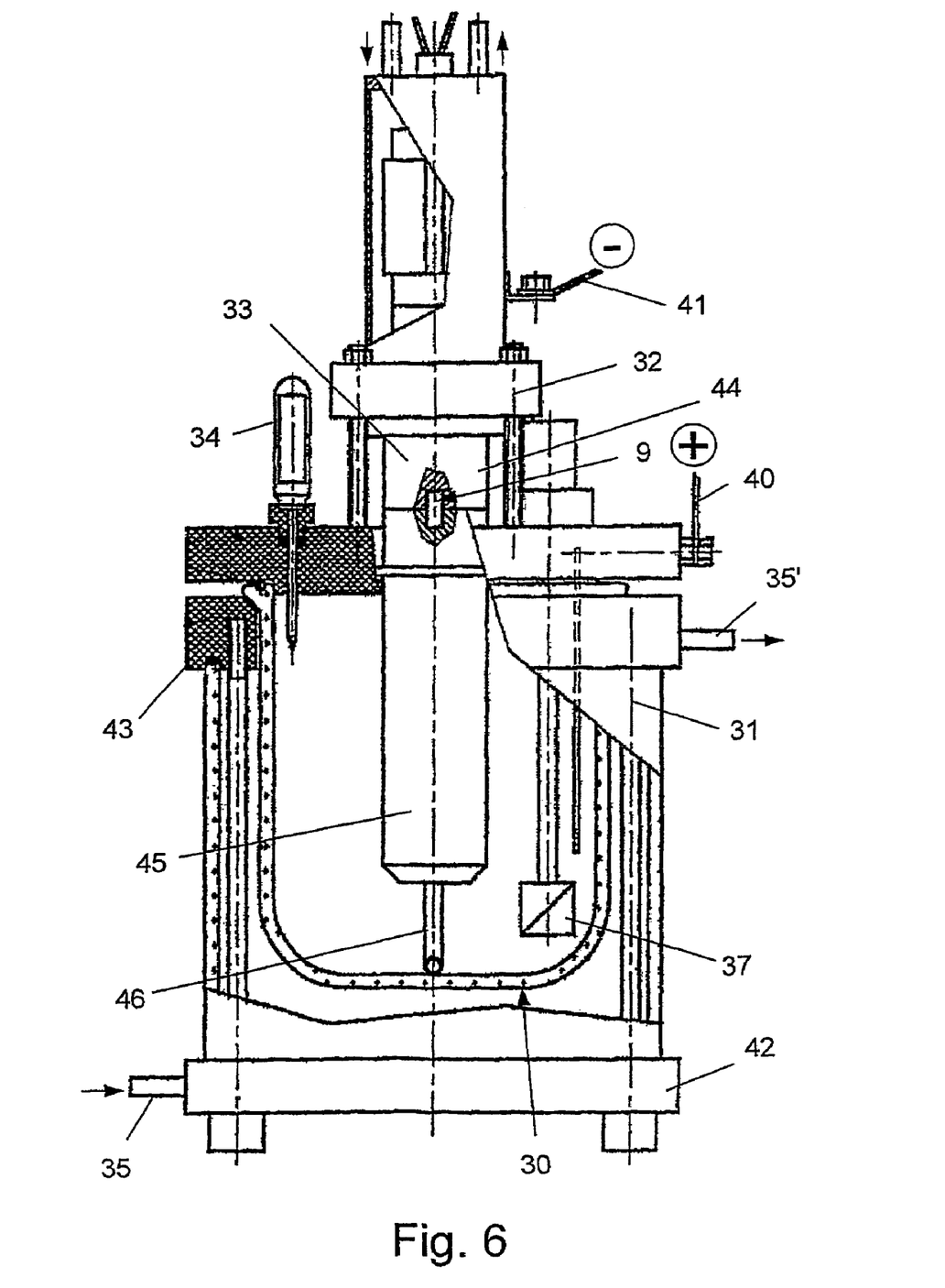
FIG. 6 is a cross-sectional view of an embodiment of a reactor in which the transducer and horn of this invention are used.

FIG. 6 is a cross-sectional view of an embodiment of a reactor that can be used in various ultrasonic applications. The reactor, generally illustrated as 30, which may be manufactured, by example, from Pyrex glass, is mounted in housing 31, and comprises upper flange 43 and lower flange 42. Ultrasonic device 33 is supported by flange 32. All said flanges are made, by example, of polypropylene. Transducer 44 is connected by a connecting insert 16 to horn 45. Thermometer 34 and an optional stirrer are connected to the reactor through the top of reactor 30. Cooling liquid is introduced into housing 31 through inlet tube 35, situated in flange 42, and is withdrawn from housing 31 by discharge tube 35', situated in flange 43. A circuit for the protection of the horn against chemical corrosion, not shown, has terminals indicated by 40 and 41. The means for feeding the exciting current to the transducer are not shown. Connection to pumps is indicated by 46. The means for supplying electric power to the coil and the means for feeding material to be treated by ultrasound are not shown, as they change from case to case.

To produce nano-metal oxides or hydrates, a metal salt solution (generally a chloride) is subjected to extremely high ultrasound energy in the presence of a basic solution, such as, by example, an alkali hydroxide. A 10-liter reactor as hereinbefore described, capable of producing energy up to 0.6 W/cm$^3$, is suitable for this purpose. Under such conditions, highly active radicals are rapidly created inside cavitation bubbles that explode rapidly, leaving nuclei of nano-particles. In such a sono-reaction, one mole of metal salt yields up to several hundred grams of nano-powder, 5 to 60 nm crystallite size, in a short reaction time.

Examples of nano-particle compounds, produced sonochemically, are oxides, such as FeO, $Fe_2O_3$, $Fe_3O_4$, NiO, $Ni_2O_3$, CuO, $Cu_2O$, $Ag_2O$, CoO, $Co_2O_3$ and hydroxide crystal hydrates, such as $Fe(OH)_3$, $Co(OH)_3$, NiO(OH). $BaTiO_3$ can be sonochemistry produced as well.

Examples of metal nano-particles produced sonochemically are Fe, Co, Cu, Ag, Ni, Pd, etc.

The reactor of the invention is an effective unit for acceleration of chemical reactions. For example, the reduction of metal salts or oxides to a metallic powder, in relatively high amounts (1 mole) is completed in 5–10 minutes. Such powders consist of ultra fine metallic or non-metallic particles in the nano-scale range (5–100 nm). The resulting products may be used in a wide range of applications, including pigments, catalysts, magnetic media, optoelectronic materials, cosmetics, chemical polishes, abrasives, composites and coatings.

The following, non-limited examples illustrate embodiments of such processes.

EXAMPLE 1

Production of Nano Iron Hydroxide Powder

The iron hydroxide is produced from an iron salt, in this example iron chloride, and a base, particularly an alkali hydroxide, in this example sodium hydroxide, according to the following reaction:

$$2FeCl_3 + 6NaOH \rightarrow 2Fe(OH)_3 + 6NaCl$$

The reagents are prepared by weighing with an analytical balance and preparing water solutions of iron chloride and sodium hydroxide.

The reaction is carried out under high power ultrasound according to the following parameters:

Reaction composition: iron chloride—80 gr.
1. sodium hydroxide—60 gr.
2. distilled water—950 gr.
Time of reaction—5 minutes The product is Nano iron hydroxide powder, having particle size below 100 nm.

EXAMPLE 2

Production of Nano-Amorphous Nickel Hydroxide $Ni(OH)_2$

The nickel hydroxide is produced from a nickel salt, in this example nickel chloride, and a base, in this example sodium hydroxide, according to the following reaction:

$$NiCl_2 + 2NaOH \rightarrow Ni(OH)_2 + 2NaCl$$

The reagents are prepared by weighing with analytical balance and preparing water solutions of nickel chloride and sodium hydroxide.

The reaction is carried out according to the following parameters:
Reaction volume—1 liter
Reaction composition: nickel chloride—70 g
a. sodium hydroxide—25 g
b. distilled water—900 ml
Time of reaction—5 minutes The product nickel hydroxide is a green amorphous material having surface area (BET)>350 m$^2$/gr and particle size (HRSEM) of 20–60 nm.

EXAMPLE 3

Production of Nano-Crystalline Cobalt Powder

The cobalt is produced from a cobalt salt, in this example cobalt chloride, and a powder of a metal capable of reducing said salt to cobalt metal (hereinafter indicated by "M"), according to the following reaction:

$$CoCl_2 + M \rightarrow Co + MCl_2$$

The reaction is carried out according to the following parameters:
Reaction volume—1 liter
Reaction composition: cobalt chloride—240 g
a. M—reducing metal
b. suitable solvent—1 liter
Time of reaction—5 minutes The product is hexagonal cobalt powder, having a specific weight of 8.9 g/cc and a black color, and particle size 10–40 nm.

Other metals can be produced by similar reactions.

EXAMPLE 4

Production of Nano-Crystalline Iron Oxide Powder $Fe_2O_3$ 80 g of anhydrous $FeCl_3$ were dissolved in 800 ml of water. 60 g of NaOH were added to 100 ml of water at room temperature. The solution of $FeCl_3$ was mixed with the solution of NaOH under ultrasound and a gelled solution of precipitates was obtained.

The gelled solution was filtrated with suction and washed thoroughly with distilled water until a test with $AgNO_3$ reagent is negative, to remove any residual free chlorine. The dried precipitates were then placed into a high temperature oven for the heat treatment, and the temperature of the oven was increased at a rate of 5° C./min to 600° C. to calcine the precipitates for 1 hour and then they were cooled at room temperature to obtain red hematite iron oxide $Fe_2O_3$ nano-powder, with particle size 20–100 nm.

While embodiments of the invention have been described for the purpose of illustration, it will be understood that the invention may be carried into practice with many modifications, adaptations and variations, without exceeding the scope of the claims.

The invention claimed is:

1. Sonochemical reactor comprising:
   a. a reactor volume confined by external walls with internal dimensions establishing resonance of ultrasonic waves in a liquid contained within the reactor volume;
   b. a high power ultrasonic transducer;
   c. a horn, of a longitudinal length directly proportional to whole number of half-wavelengths of ultrasonic waves in the horn material, attached to the transducer and outwardly emitting ultrasonic energy into the reactor volume; and
   d. an internal cavity of said horn characterized by resonant properties and providing, in accordance with Poisson's effect, an efficient transformation of longitudinal ultrasonic oscillations received from the transducer into transversal ultrasonic oscillations of the external walls of the horn in such a way that the distribution of ultrasonic energy throughout the reactor volume is homogeneous.

2. Sonochemical reactor according to claim 1, wherein said reactor volume is of a cylindrical shape with the distance between the external surface of said horn and the internal surface of said walls directly proportional to a whole number of half-wavelengths of sound in the contained liquid.

3. Sonochemical reactor according to claim 1, wherein the distance between a horn tip and a bottom surface of said reactor volume is equal to whole number of half wavelengths of ultrasound in the contained liquid.

4. Sonochemical reactor according to claim 1, wherein said ultrasonic transducer is of a magnetostrictive type.

5. Sonochemical reactor according to claim 4, wherein the power emitted by said transducer is higher than 1 kW.

6. Sonochemical reactor according to claim 1, wherein the longitudinal length of said horn in the direction of longitudinal ultrasonic wave propagation is equal to whole number of half wavelengths of ultrasound in the horn material.

7. Sonochemical reactor according to claim 1, wherein said horn is of a cylindrical shape.

8. Sonochemical reactor according to claim 7, wherein the internal cavity of said horn is of a cylindrical shape, coaxial with an external emitting surface of the horn.

9. Sonochemical reactor according to claim 8, wherein the internal cavity comprises a plurality of cylindrically shaped sections of differing diameters.

10. Sonochemical reactor according to claim 9, wherein the internal cavity comprises a central section of larger diameter and two end sections of smaller diameter.

11. Sonochemical reactor according to claim 10, wherein said horn comprises the following elements:
   a. a cylindrical body element comprising the central section of the internal cavity and a smaller diameter end section of internal cavity; and
   b. a cylindrical plug element of smaller diameter comprising a second smaller diameter end section of internal cavity which is screwed to the main element by a thread connection.

* * * * *